Figure 1:
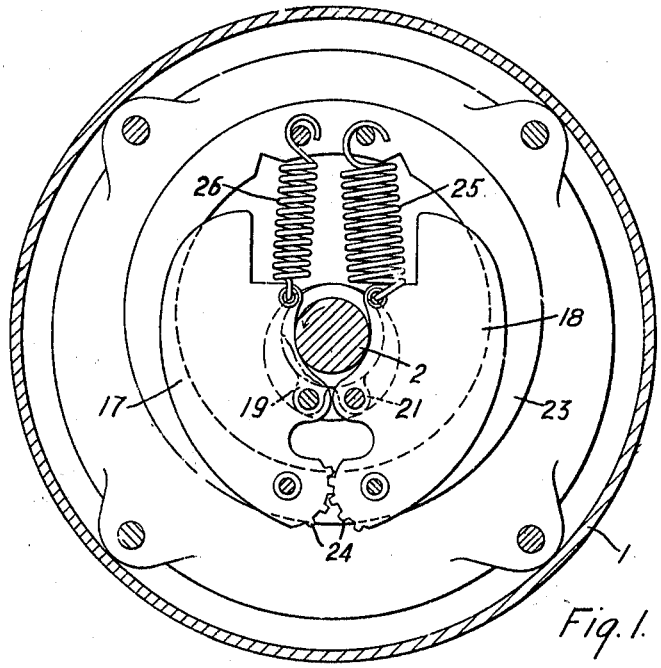

C. AALBORG.
IGNITION MECHANISM.
APPLICATION FILED AUG. 28, 1915.

1,314,492.

Patented Sept. 2, 1919.

WITNESSES:
Fred A. Lind.
J. R. Langley.

INVENTOR
Christian Aalborg
BY
Wesley G. Carr
ATTORNEY

UNITED STATES PATENT OFFICE.

CHRISTIAN AALBORG, OF WILKINSBURG, PENNSYLVANIA, ASSIGNOR TO WESTINGHOUSE ELECTRIC AND MANUFACTURING COMPANY, A CORPORATION OF PENNSYLVANIA.

IGNITION MECHANISM.

1,314,492.   Specification of Letters Patent.   Patented Sept. 2, 1919.

Application filed August 28, 1915. Serial No. 47,886.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Ignition Mechanisms, of which the following is a specification.

My invention relates to ignition mechanisms and particularly to automatic means for controlling the timing of ignition sparks that are produced in the cylinders of internal combustion engines.

My invention has for one of its objects to provide a simple and efficient means for automatically adjusting ignition devices of internal combustion engines in accordance with the engine speed.

A second object of my invention is to provide a device of the above indicated character which at all times effects an adjustment of the ignition mechanism corresponding to the actual speed of the engine and is not affected by the inertia of the controlling mechanism when the engine is accelerated or retarded.

A further object of my invention is to provide an arrangement whereby the rate at which the angular relation of the ignition mechanism to its driving member is adjusted in accordance with variations in speed, is changed automatically when the engine operates above a predetermined speed.

Automatic devices for controlling ignition mechanisms, or spark advancers, of the same general character as that of my invention have been provided heretofore, but they possess the defect that they are not only responsive to the speed of the driving member, but they are also affected by the inertia of weight members that are actuated outwardly by centrifugal force. When the engine of the motor vehicle is being accelerated or retarded, the adjustment of the ignition mechanism for controlling the timing of the spark in the engine cylinders does not correspond to the actual speed of the engine.

When the engine is being accelerated, the inertia of the weight members may, for example, augment the effect produced by centrifugal force and the angle through which the spark is advanced is excessive. When the engine is retarded, the inertia of the weight members has the opposite effect and the spark does not occur sufficiently early in the stroke of the engine piston. The above results are obtained when the speed-responsive device is rotated in one direction but the effects are reversed when the device is rotated in the opposite direction.

In an automatic spark advancer constructed in accordance with the present invention, the weight members are so arranged that their inertia causes them to tend to move in the same direction about their points of pivotal support, when they are driven at an increasing speed or a decreasing speed. The weights are so connected, however, that they must always move in opposite directions about their points of pivotal support. Hence, the tendencies of the weights to vary the time of the spark because of their inertia when the engine is being accelerated or retarded are neutralized by causing the forces to oppose each other. The positions of the weights are governed, therefore, by centrifugal force only and the spark is timed in accordance with the actual speed of the engine.

It is well known that, as the speed of an internal combustion engine increases, the ignition spark must be so timed as to occur at a progressively earlier point in the stroke of the engine piston. It is known, also, that the curve representing the proper angle of advance for the various speeds is not a straight line, but a curve having a comparatively sharp bend at an intermediate point. The angle of advance should be varied to a greater degree for a change in speed at the lower values than for a similar change between higher values. An automatic device for controlling the timing of the spark which operates directly with the speed of the engine does not, therefore, correctly adjust the ignition mechanism throughout the range of engine speeds.

In order to produce a variation in the angle of advance which substantially conforms to the curve above mentioned, I provide two springs for opposing the outward movement of the weight members in response to centrifugal force. Only one of the springs is effective for speeds up to a predetermined rate, the other spring having a lost-motion connection to the parts to which it is secured.

Beyond the predetermined speed, both springs are effective and the rate at which the angle of advance is changed in accordance with variations in speed is accordingly decreased. The result is to produce an adjustment of the ignition mechanism for the various speeds which is represented by a broken line, the two component parts of which meet at a point representing the predetermined speed. While this line does not coincide with the curve at all points, it is sufficiently accurate for all practical purposes.

Figure 2:
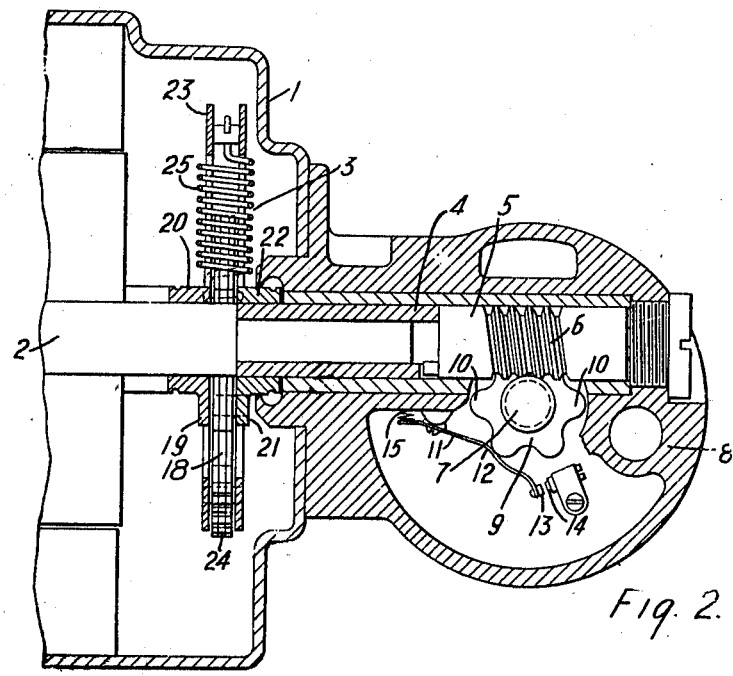

In the accompanying drawings, Figure 1 is a view, partially in elevation and partially in section, of a dynamo-electric machine with my invention applied thereto. Fig. 2 is a side view, partially in elevation and partially in section, of the mechanism of Fig. 1.

A dynamo-electric machine 1 has an armature shaft 2 which may be operatively connected to the shaft of an internal combustion engine in any suitable manner (not shown). The dynamo-electric machine may be driven by the engine to furnish current for ignition or lighting purposes or for charging a storage battery. The armature shaft 2 is connected, through a speed-responsive device 3, a tubular sleeve member 4, a short shaft 5 and a worm gear mechanism 6, to the rotatable shaft 7 of an ignition mechanism 8.

The ignition mechanism may consist, for example, of the usual interrupter which comprises a cam 9 that is fixed on the shaft 7 and is provided with projections 10 which correspond in number to the cylinders of the engine in connection with which it may be employed. A pivoted lever 11 has integral with it a projection 12 which coacts with the projections 10 of the cam 9. The lever 11 carries, at its outer end, a contact member 13 which coacts with a stationary contact member 14 to control the production of ignition sparks in the usual and well-known manner. A spring 15 normally retains the lever 11 in its illustrated position to maintain the engagement of the contact members 13 and 14.

The speed-responsive mechanism 3 comprises a pair of weight members 17 and 18. The weight member 17 is pivotally connected to a radially projecting arm 19 that is integral with a collar member 20 secured to the armature shaft 2. The weight member 18 is pivotally connected to a corresponding arm 21 that is integral with a collar member 22 fixed on the sleeve 4, the latter being operatively connected to the stub shaft 5. The weight members 17 and 18 are also pivotally connected to a floating ring 23 which surrounds the shaft 2.

The weight members 17 and 18 are provided with interfitting coacting gear teeth 24 to insure that the movement of one of them about its point of pivotal attachment to the floating ring 23 is accompanied by an equal corresponding movement of the other weight member in an opposite direction. The members 17 and 18 are normally retained in their respective positions relatively to their associated parts as illustrated in Fig. 1 by a spring 25 which is attached at one end to the weight member 18, and, at the other end, to the ring 23. A spring 26, which is connected to the weight member 17, has a lost motion connection to the ring 23.

It may be assumed that the several parts are in their respective illustrated positions and that the shaft 2 of the dynamo-electric machine is rotated at an increasing rate of speed to operate the ignition mechanism 8 through the connections above described. It may be assumed further that the shaft 2 is rotating in a counter clockwise direction, as viewed in Fig. 1. As the weight members 17 and 18 revolve about the axis of the shaft 2, centrifugal force tends to actuate them outwardly against the force of the spring 25 which is directly connected to the member 18 and is connected to the member 17 through the member 18 and the gear teeth 24.

As the speed increases, the members 17 and 18 rotate about their points of pivotal attachment to the ring 23, their positions, at all times, being such that the centrifugal force is balanced by the increased tension of the spring 25. Outward movements of the members 17 and 18 cause a corresponding relative movement in opposite directions of the lever arms 19 and 21 and the respective collar members 20 and 22 which are integral therewith.

Since the collar member 20 is rigidly secured to the armature shaft 2, there can be no relative movement between these parts, and their angular relation will remain the same. The arm 21, which is attached to the sleeve member 4 and is operatively connected to the ignition mechanism, is caused to change its angular position relatively to the armature shaft 2. The movement of the arm 21 and its connected parts relatively to the shaft 2 is in a counter-clockwise direction, as viewed in Fig. 1.

The result of the change in relative positions of the armature shaft 2 and the collar member 22 which is connected to the ignition mechanism by the sleeve 4, shaft 5, gear mechanism 6 and shaft 7, is to cause a corresponding change in the angular position of the interrupter cam 9. The contacts 13 and 14 are accordingly separated to cause an ignition spark at an earlier point in the stroke of the engine piston than when the several parts were in their initial positions.

As the members 17 and 18 are actuated outwardly to an increased distance from the shaft 2, a predetermined speed is reached at which the spring 26 exerts its force to assist the spring 25 in opposing the outward movements of the weight members. It will be evident, therefore, that a greater increase in speed must occur in order to cause a corresponding change in the position of the weight members than is necessary when the spring 25 alone controls their position. The effect is to decrease the rate at which the relative angular positions of the armature shaft 2 and the ignition shaft 7 are changed in accordance with variations in speed.

It will be noted that, as the collar member 21 rotates relatively to the armature shaft 2, the line joining the axes of the points of pivotal attachment of the weight members to the respective collar members 20 and 22 approaches the armature shaft 2. The result is to cause the floating ring 23 to shift its position laterally with respect to the armature shaft 2. This movement will be in an upward direction, as viewed in Fig. 1. The effect of the movement of the ring 23, to which the weight members are pivotally attached, is to cause a corresponding movement of the centers of gravity of the weight members and thereby counteract the unequal distribution of weight produced by the outward movement of the weight members.

The speed-responsive mechanism is not affected by the inertia of the weight members when the speed is varied. As will be readily perceived, the inertia of the weight members 17 and 18, which operates in straight lines and is tangential to the rotating member, tends to move the weight members in the same direction about their points of pivotal attachment to the ring 23. As above set forth, the gear teeth 24 permit rotative movements of the members 17 and 18 in opposite direction only, and the tendencies to rotate neutralize each other.

When the engine speed decreases, the centrifugal force, which actuates the weight members 17 and 18 outwardly, is correspondingly lessened and the springs 25 and 26 operate to draw the weight members inwardly to a position corresponding with the speed. The inward movement of the weight members causes the lever arm 21 and the collar member 22 to be rotated in a clockwise direction relatively to the armature shaft 2 and its connected parts. The ignition mechanism is accordingly retarded relatively to the armature shaft 2 and the ignition sparks are produced at a later point in the stroke of the engine piston.

It will be noted that I provide a speed-responsive mechanism which is simple in arrangement and compact in form for automatically controlling the timing of ignition sparks. The adjustment of the ignition mechanism corresponds to the actual speed of the engine and the rate at which the adjustment is effected conforms substantially to the curve representing the proper angle of advance for the various speeds. By employing a floating pivotal support for the weight members, a balanced condition with respect to the rotating shaft is automatically maintained throughout the range of speed. These and other advantages will be apparent to those skilled in the art to which my invention appertains.

While I have shown and described the speed-responsive device as employed in connection with a dynamo-electric machine, it will be understood that such use is illustrative only. The speed-responsive device may, if desired, be employed in connection with an ignition mechanism alone to constitute an ignition unit.

I claim as my invention:

1. In an ignition mechanism, the combination with a pair of operatively connected rotatable members, of means for automatically controlling the angular relation of said members, said means comprising a pair of weight members respectively connected to said rotatable members, and coöperating gear teeth on each weight member, so that their movements will be equal.

2. In an ignition mechanism, the combination with a pair of operatively connected rotatable members, of means for automatically controlling the angular relation of said members, said means comprising a pair of weight members each of which is pivotally connected to one of said rotatable members and is provided with means for insuring simultaneous pivotal movements of said weight members in opposite directions.

3. In an ignition mechanism, the combination with a pair of operatively connected rotatable members, of means for automatically controlling the angular relation of said members, said means comprising a pair of weight members each of which is pivotally connected to one of said rotatable members and is provided with gear teeth for coacting with gear teeth on the other weight member.

4. In an ignition mechanism, the combination with a pair of operatively connected rotatable members, of means for automatically controlling the angular relation of said members, said means comprising a pair of weight members each of which is pivotally connected to one of said rotatable members for outward radial movement relatively thereto, and means for successively opposing the outward movements of said weight members with forces of different strengths.

5. In an ignition mechanism, the combination with a pair of operatively connected rotatable members, of means for automatically controlling the angular relation of said members, said means comprising a pair of weight members each of which is pivotally connected to one of said rotatable members for outward radial movement relatively thereto and a pair of springs for successively opposing the outward movements of said weight members.

6. In an ignition mechanism, the combination with a pair of alined rotatable shafts, of a pair of members respectively connected to said shafts for outward movement relatively thereto in response to centrifugal force, said members being symmetrically disposed about an axis transverse to said shafts and having coacting gear teeth whereby their movements are invariably equal and they are not responsive to the rate of change of speed of said shafts.

7. In an ignition mechanism, the combination with a pair of alined rotatable shafts, of a pair of operatively connected members respectively connected to said shafts for outward movement, relatively thereto in response to centrifugal force, said members being pivotally mounted and having coacting gear teeth for insuring simultaneous equal movements in opposite directions about their respective points of pivotal support.

8. In an ignition mechanism, the combination with a pair of rotatable elements, of a pair of members responsive to centrifugal force respectively pivotally connected to said elements, an annular member around one of said elements and pivotally secured to said members, and means for yieldingly retaining said members in one position.

9. In an ignition mechanism, the combination with a pair of rotatable shafts, of a pair of speed responsive members respectively connected to said shafts and operatively connected to each other, an element pivotally connected to said members, and a spring between each of said members and said element.

10. In an ignition mechanism, the combination with a pair of rotatable shafts, of speed responsive means for varying the angular relation of said shafts, said means comprising means operable at a predetermined speed for changing the rate at which the angular relation is varied.

In testimony whereof, I have hereunto subscribed my name this 20th day of Aug. 1915.

CHRISTIAN AALBORG.